US 8,451,214 B2

United States Patent
Lin et al.

(10) Patent No.: US 8,451,214 B2
(45) Date of Patent: May 28, 2013

(54) REMOTE CONTROLLED POSITIONING SYSTEM, CONTROL SYSTEM AND DISPLAY DEVICE THEREOF

(75) Inventors: Kun-Wei Lin, Hsin Chu (TW); Li-Ming Chen, Chieh Lung (TW)

(73) Assignee: Sunplus mMedia Inc., Hsinchu Science Park (TW)

( * ) Notice: Subject to any disclaimer, the term of this patent is extended or adjusted under 35 U.S.C. 154(b) by 1086 days.

(21) Appl. No.: 12/121,987

(22) Filed: May 16, 2008

(65) Prior Publication Data

US 2009/0027336 A1    Jan. 29, 2009

(30) Foreign Application Priority Data

Jul. 23, 2007   (TW) ................................ 96126767 A

(51) Int. Cl.
*G09G 5/00*   (2006.01)
(52) U.S. Cl.
USPC ............................................ 345/156; 463/37
(58) Field of Classification Search
USPC ............ 345/156, 157, 158, 173–179; 463/37; 178/18.09, 18.11
See application file for complete search history.

(56) References Cited

U.S. PATENT DOCUMENTS

| | | | |
|---|---|---|---|
| 5,440,114 A * | 8/1995 | Barbier et al. | 250/206.2 |
| 7,394,459 B2 * | 7/2008 | Bathiche et al. | 345/175 |
| 7,499,027 B2 * | 3/2009 | Brigham et al. | 345/158 |
| 7,690,994 B2 * | 4/2010 | Dohta | 463/37 |
| 7,839,384 B2 * | 11/2010 | Blythe et al. | 345/158 |
| 7,936,428 B2 * | 5/2011 | Takahashi et al. | 349/141 |
| 2006/0209013 A1 * | 9/2006 | Fengels | 345/156 |
| 2006/0284841 A1 * | 12/2006 | Hong et al. | 345/157 |
| 2007/0049374 A1 | 3/2007 | Ikeda et al. | |
| 2007/0052177 A1 | 3/2007 | Ikeda et al. | |
| 2007/0060391 A1 * | 3/2007 | Ikeda et al. | 463/46 |
| 2008/0074401 A1 * | 3/2008 | Chung et al. | 345/175 |
| 2008/0121442 A1 * | 5/2008 | Boer et al. | 178/18.09 |

* cited by examiner

*Primary Examiner* — Tom Sheng
(74) *Attorney, Agent, or Firm* — Muncy, Geissler, Olds & Lowe, PLLC

(57) ABSTRACT

The invention relates to a remote controlled positioning system, a control system and a display device thereof. The remote controlled positioning system includes a liquid crystal display (LCD) panel, a backlight source, a plurality of infrared ray (IR) sources and a directional remote controller. The LCD panel includes a plurality of display areas. The plurality of IR sources is disposed behind the LCD panel, wherein the IR sources are correspondingly disposed according to the positions of the display areas to respectively emit infrared rays to pass through the LCD panel. The directional remote control receives the infrared rays emitted by the infrared ray sources to obtain positional information pointed to a position of the LCD panel by the directional remote control.

8 Claims, 5 Drawing Sheets

US 8,451,214 B2

REMOTE CONTROLLED POSITIONING SYSTEM, CONTROL SYSTEM AND DISPLAY DEVICE THEREOF

This application claims the benefit of the filing date of Taiwan Application Ser. No. "096126767", filed on "Jul. 23, 2007", the content of which is incorporated herein by reference.

BACKGROUND OF THE INVENTION

1. Field of the Invention

The present invention relates to a technology for control system. More particularly, the present invention relates to a remote controlled positioning system, a control system and a display device thereof.

2. Description of the Related Art

In recent years, video game consoles become more and more popular because of development of science and technology. Wii console developed by the Nintendo Company is one of the most popular in recent video console. The success of the Wii console are innovation of the product, reformation of game playing, joystick controlled by one hand and simple and easy game software to get the hand of it. The player can interact with the image on the screen of display through actions of swinging and waving with the joystick, so that a lot of fun in video game can be produced. The Nintendo Company also applied for patents with controller related to joystick, such as U.S Publication NO US20070049374 and US20070052177 and so on.

FIG. 1 is a diagram of a remote control system. Referring to FIG. 1, the reference light sources 8L and 8R is disposed to the frame of the display device 2. A user uses the sensing apparatuses of the remote controls 70 and 76 for establishing a correspondingly positioning relationship between the reference light sources 8L and 8R and the reference points 11 and 12. The remote controls 70 and 76 must sense the reference light sources 8L and 8R and the reference points 11 and 12 in the same time so as to establish the relationship. Thus, the user must keep a preset distance with the display device 2 for operation. If the remote controls 70 and 76 handed by the user are comparatively near with the display device 2, the abovementioned positioning relationship will be destroyed. In other words, if user does not stand at original position when it establishes the correspondingly positioning relationship, such as a position near the display device 2 or a far side from the display device 2, the coordinate positioned by the remote controls 70 and 76 will be no longer accurate. There are no spatially corresponding relationship between those reference light sources 8L and 8R and pixels of the display device 2, and it will cause user inconvenience when user operates it. In addition, when display device becomes larger, user have to stand at the farther side from the display device to availably establish the correspondingly positioning relationship. Insidiously, it causes a spatial limit when user uses the abovementioned remote control system.

SUMMARY OF THE INVENTION

In view of the above-mentioned problems, the present invention is direct to a remote controlled positioning system. It is unnecessary to calibrate to any reference point.

In addition, the present invention is direct to a display device for providing coordinate information. There is a corresponding relationship between the coordinate information and the pixels thereof, thus a directional remote control for controlling the display device can be to accurately capture the coordinate pointed by the directional remote control, and the distance between the display device and the directional remote control and size of the display device are unnecessary for consideration.

In addition, the present invention is direct to a control system for controlling a controlled apparatus disposed outside from a display device through a plurality of infrared ray (IR) source disposed in a display device of the control system.

To achieve the above-mentioned object and others, a remote controlled positioning system is provided in this invention. The remote controlled positioning system includes a liquid crystal display (LCD) panel, a backlight panel and a directional remote control. The LCD panel includes a plurality of display areas. The backlight panel includes a plurality of IR sources disposed behind the LCD panel wherein the IR sources are correspondingly disposed according to the display areas for emitting IR ray which can pass through the LCD panel. The directional remote control receives IR rays emitted from the IR sources to obtain positioning information pointed by the directional remote control.

In one embodiment of the present invention, the directional remote control includes a lens, an IR filtering component and an IR sensor. The lens is for receives the IR rays and a visible light emitted from the display device. The IR filtering component is for removing the visible light received by lens and making the IR ray pass through the IR filtering component. The IR sensor is disposed behind the IR filtering component and the lens and used for receiving the IR rays to determine and obtain the positioning information. In a specific embodiment, the IR sensor can be an area sensor.

A control system is provided in the present invention. The system includes an LCD panel, a backlight panel and a controlled apparatus. The LCD panel is disposed on the backlight panel and includes a plurality of display areas. The backlight panel includes a plurality of IR sources, wherein the IR sources are correspondingly disposed according to the display areas and used for emitting IR ray to pass through the LCD panel. The controlled apparatus receives the IR rays, and executes an operating control according to the IR ray emitted from the IR sources.

A display device is provided in the present invention. The display device includes an LCD panel and a backlight panel. The LCD panel is disposed on the backlight panel and includes a plurality of display areas. The backlight panel includes a plurality of IR sources. The IR sources are correspondingly disposed according to the display areas, and the IR sources are used for emitting IR rays to pass through the LCD panel for transmitting a specific message to outside of the display device.

According to the remote controlled positioning system, the control system and the display device in the preferring embodiment of the present invention, the LCD panel includes a first polarization film, a second polarization film and a pixel array, wherein a polarizing direction of the second polarization film and a polarizing direction of the first polarization film are mutually orthogonal and the pixel array is disposed between the first polarization film and the second polarization film.

In the remote controlled positioning system, the control system and the display device of the present invention, a plurality of IR sources is set in the LCD device, wherein the IR rays emitted from the IR sources can pass through the LCD panel and directly give information to outside. Thus, a positioning relationship can be established base on overlapping of the IR sources and pixels of the LCD device. In addition, the directional remote control can obtain a coordinate pointed to LCD panel through the IR sources. In addition, since the IR sources are set in the LCD device, therefore, the LCD device can control an external controlled apparatus according to its broadcasting video scene or another control parameter.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

EMBODIMENT OF THE INVENTION

Figure 1:
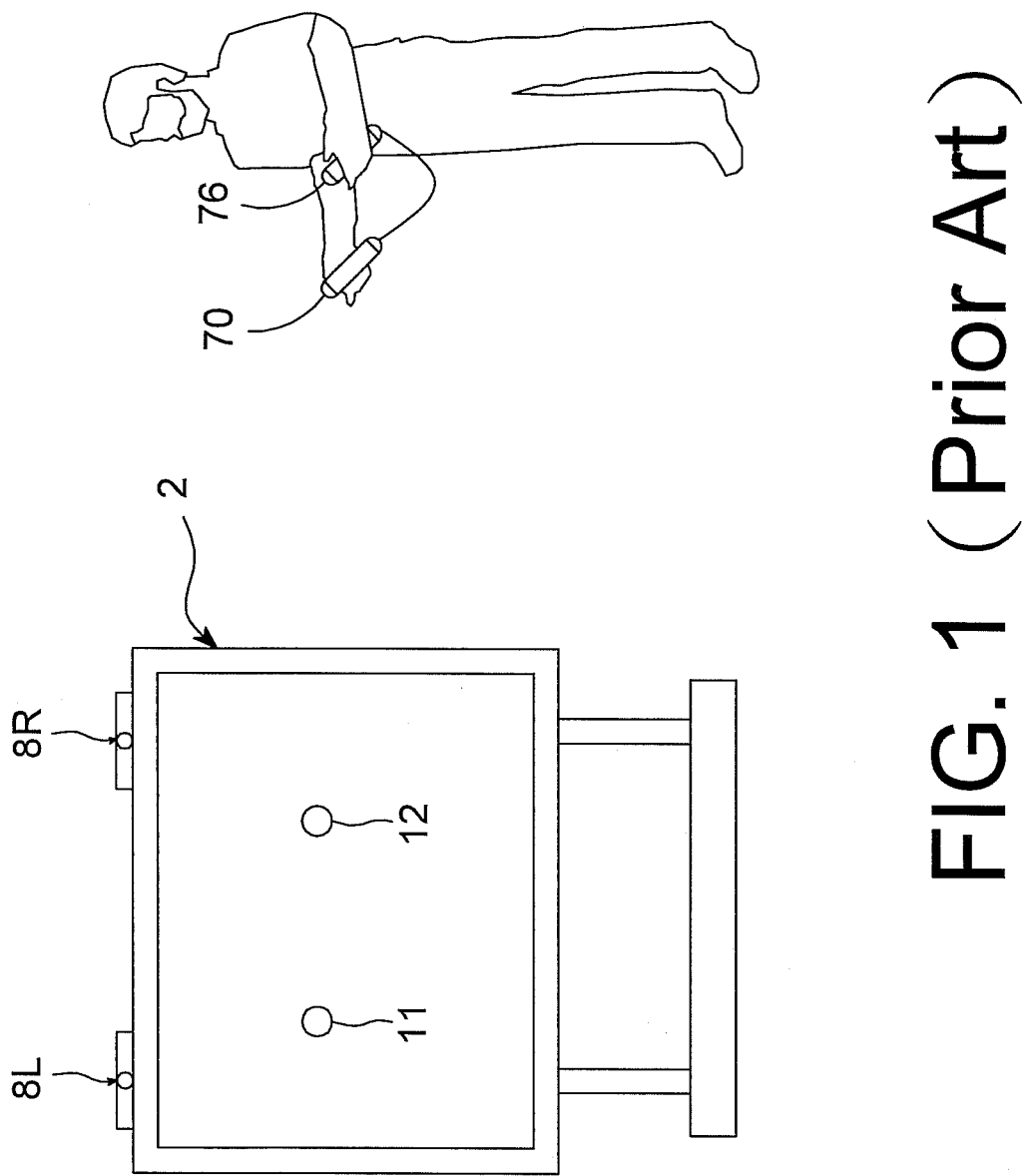
FIG. 1 is a diagram depicting a coordinate positioning system of game console in the prior art.
Figure 2A:
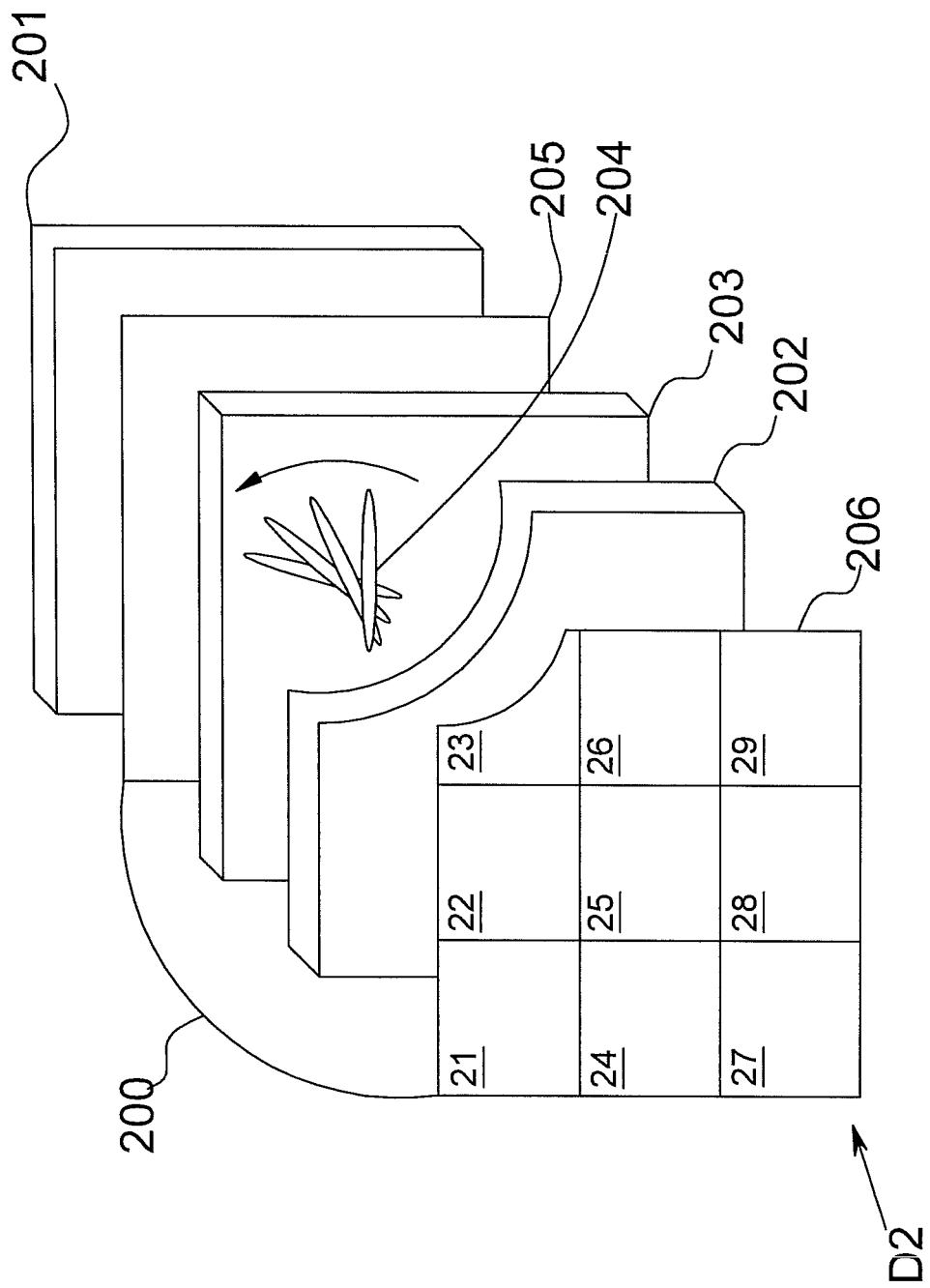
FIG. 2A is a structure diagram depicting a display device according to an embodiment of the present invention.
Figure 2B:
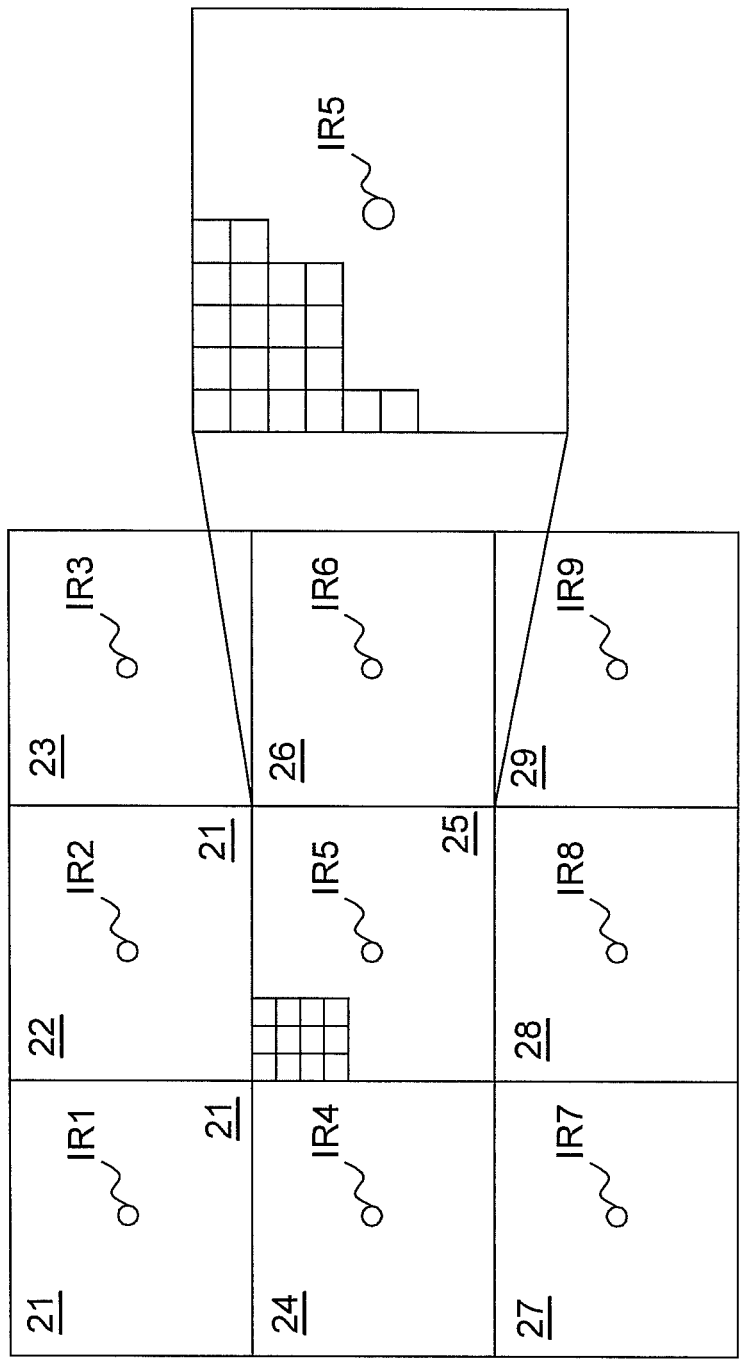
FIG. 2B is a diagram depicting a disposition of the IR sources in FIG. 2A according to the embodiment of the present invention.

FIG. 2A is a structure diagram of a display device according to an embodiment of the present invention. Referring to FIG. 2A, the display device D2 includes an LCD panel 200 and a backlight panel 201, wherein the LCD panel 200 includes glass substrates 202 and 203, a liquid crystal layer 204 and polarization films 205 and 206. In general, a polarizing direction of the polarization film 205 is orthogonal to a polarizing direction of the polarization film 206. In addition, the LCD panel is divided into 9 display areas 21~29. FIG. 2B is a diagram depicting a disposition of the IR sources in FIG. 2A according to the embodiment of the present invention. Referring to FIG. 2B, the backlight panel 201 includes 9 IR sources IR1~IR9 which correspondingly disposed according to the 9 display areas.

As FIG. 2A, the composition of LCD panel 200 is the glass substrates 202 and 203, the liquid crystal layer 204 and the polarization films 205 and 206. The display device changes a light transmittance according to the rotating angle of liquid crystal molecules between the front glass substrate and the back glass substrate 202 and 203. However, the display device D2 can only change the transmittance when the wavelength of light ranges within visible light range. But, the display device D2 cannot change the light transmittance when the wavelength of light ranges within IR light range. In addition, the transmittance of the LCD panel 200 is extremely high for IR ray whose wavelength is between 800 nm to 1000 nm. Therefore, the abovementioned characteristic is used in the embodiment of the present invention, and the IR sources IR1~IR9 is disposed after the LCD panel 200. Since the IR sources IR1~IR9 is overlapped pixels of the LCD panel 200 so that the coordinated relationship can be established as FIG. 2B.

Figure 3A:
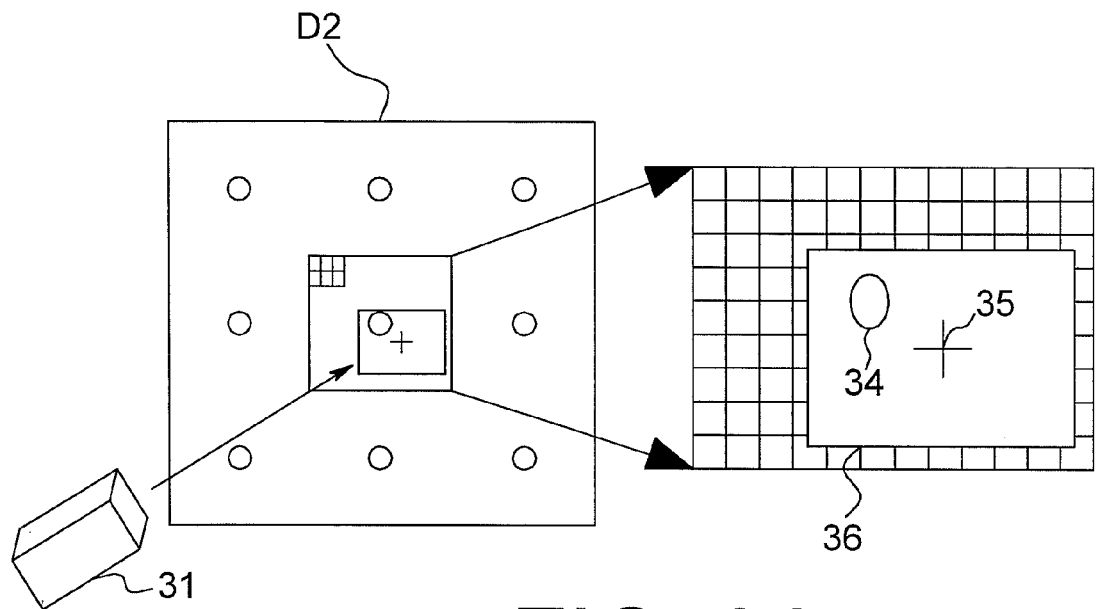
FIG. 3A is diagram depicting a positioning system according to an embodiment of the present invention.
Figure 3B:
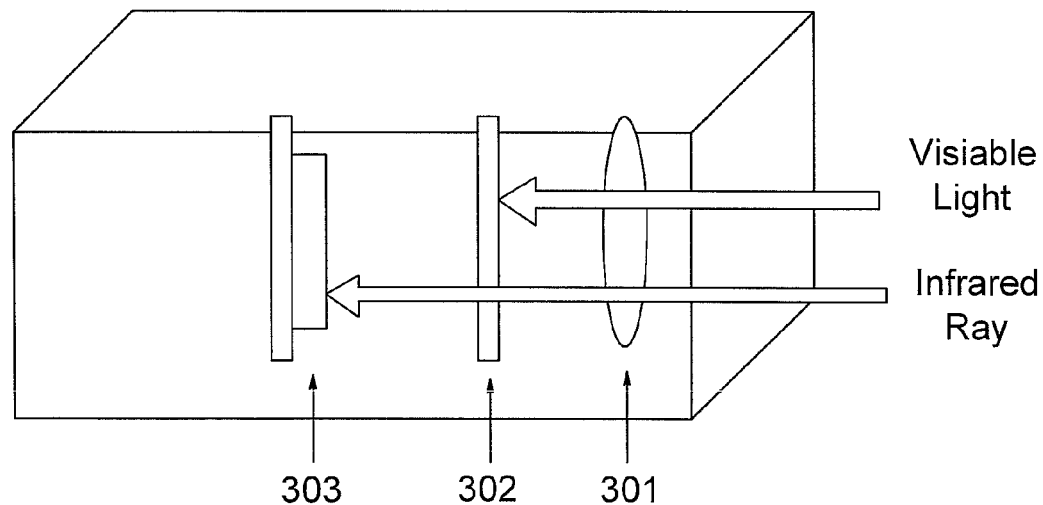
FIG. 3B is a structure diagram depicting the directional remote control 31 in FIG. 3A according to the embodiment of the present invention.

FIG. 3A is a diagram depicting a positioning system according to a embodiment of the present invention. Referring to FIG. 3A, the positioning system includes the abovementioned display device D2 and a directional remote control 31. FIG. 3B is a diagram depicting a structure of the directional remote control 31 in FIG. 3A according to the embodiment of the present invention. Referring to FIG. 3A and FIG. 3B, the directional remote control 31 includes a lens 301 which is used for formation of image, a IR filtering component 302 which is used for blocking the visible light and making the IR ray pass through, and a IR sensor 303, wherein the IR sensor 303 can be implemented by an area sensor.

When the directional remote control captures the reference point 35, the IR filtering component 302 of the directional remote control 31 can remove the external visible light from the display device or the other, and it can let IR sensor only receive IR rays generated by the IR sources IR1~IR9. Thus, the signal to noise ratio (SNR) of the IR sensor 303 can be increased. Since the IR sensor 303 is implemented by the area sensor, the area sensor could sense the position 34 of the IR sources, which is near from the reference point 35 pointed by the directional remote control 31. The remote control 31 can estimate the relative position aimed by the remote control 31 according to the position 34 of the IR source and the center position of the area sensor 35.

It should be noted that although in the abovementioned embodiment, a possible form of the remote control positioning system and the display device of the embodiment of present invention has been described. Person having ordinary skill in the art should know that manufacturers have different designs of the display device. Therefore, the application of the present invention should not be limited to this possible form. In other words, it conforms to the essence of the present invention as long as the display device utilize the characteristic which IR ray can pass through LCD panel to hide the IR source behind the LCD panel.

In the abovementioned embodiment of the present invention, since the IR sources IR1~IR9 and the pixels on the LCD panel 200 are overlapped, so that the positioning relationship of the IR sources IR1~IR9 and pixels on the LCD panel 200 can be accurately established. In the prior art, the IR source is disposed on the edge of the frame of the display device, although, and the positioning relationship can be established between the pixels on LCD panel and IR source. However, since the captured image relate to the distance between LCD panel and remote control, the accuracy of positioning by remote control will be reduced due to the size of the display being larger, which resulting in limitation on use. Therefore, the display device D2 in the embodiment of the present invention and the remote control positioning system can apparently solve the problem in the prior art.

Figure 4:
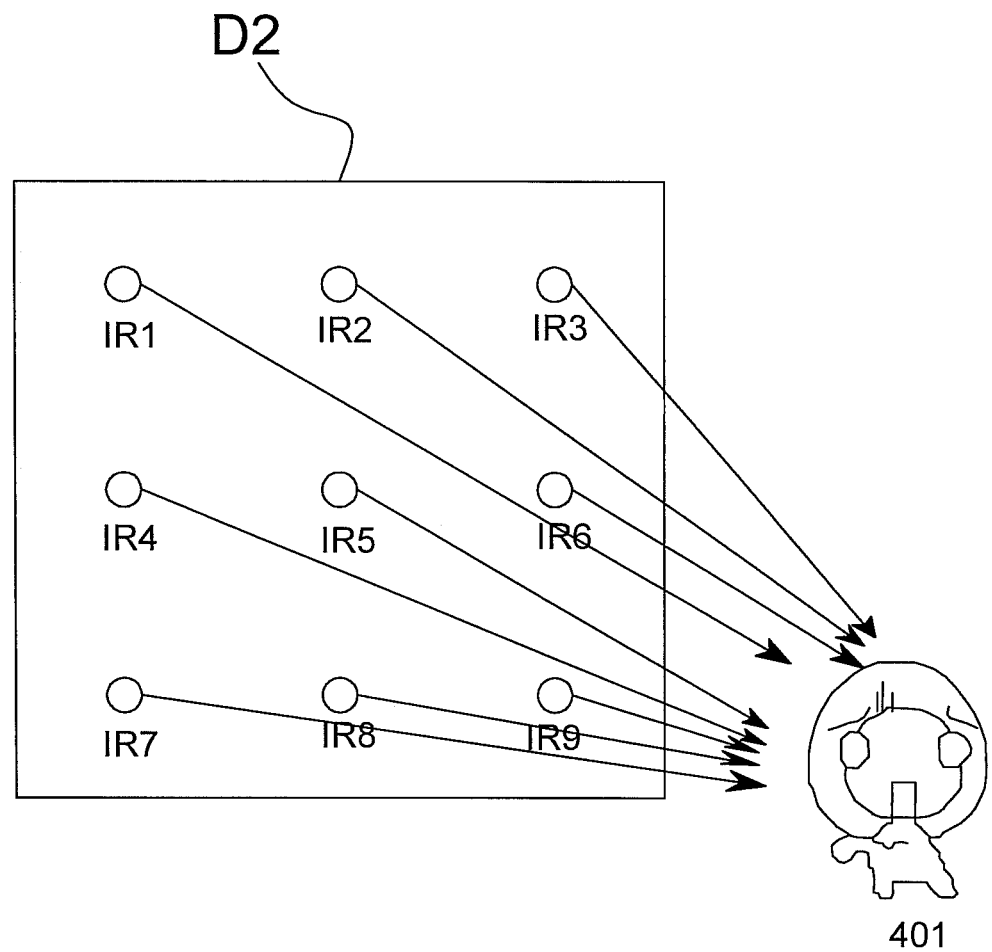
FIG. 4 is a diagram depicting a control system according to an embodiment of the present invention.

FIG. 4 is a diagram depicting a control system according to an embodiment of the present invention. Referring to FIG. 4, the control system includes a display device D2 and a controlled apparatus 401. In the embodiment, assuming the controlled apparatus 401 is a doll. A plurality of IR source IR1~IR9 of the display device D2 can change intensities of the IR rays emitted from the IR source IR1~IR9 according to its broadcasting video scene. Assuming the broadcasting video scene is thriller, the IR sources IR1~IR9 respond to the broadcasting video scene to emit IR rays. When the controlled apparatus 401 received IR rays emitted from the IR sources IR1~IR9, it would respond to represent a fear and holding user used the controlled apparatus 401 or represent a scared expression and so on.

In comparison with prior art, a plurality of IR sources are adapted in the present invention includes the advantages of:

1. The IR sources and pixel on the LCD panel are overlapped, thus, the relationship of coordinate between both can be accurately established.

2. It is unnecessary to consider a distance between the external directional remote control and display device and size of display device, and the positioning coordinate can be accurately and easily obtain.

3. The display device can control or interact with a controlled apparatus according to its broadcasting video scene or another control parameter.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A remote control positioning system, comprising:
   an LCD panel, disposed on a backlight panel, comprising a plurality of display areas;
   a plurality of infrared ray (IR) sources, for emitting IR rays to pass through the LCD panel, wherein the plurality of IR sources are disposed on the backlight panel according to correspondingly the plurality of display areas; and
   a directional remote control, receiving at least one of the IR rays emitted from the IR sources to obtain a positioning information relating to the directional remote control pointed to the LCD panel,
   wherein the IR rays emitted from the IR sources pass through the LCD panel for transmitting a specific message to outside,
   wherein a controlled apparatus outside the LCD panel is controlled by a content of the specific message, and the different content of the specific message induces different responses of the controlled apparatus.

2. The remote control positioning system according to claim 1, wherein the directional remote control comprises:
   a lens, for receiving a visible light and the IR rays;
   an IR filtering component, disposed after the lens, for removing the visible light received from the lens; and
   an IR sensor, disposed after IR filtering component, for receiving the IR rays to obtain the positioning information.

3. The remote control positioning system according to claim 2, wherein the IR sensor is an area sensor.

4. The remote control positioning system according to claim 1, wherein the LCD panel comprises:
   a first polarization film;
   a second polarization film, the polarizing direction thereof is orthogonal with the first polarization film;
   a first glass substrate, disposed between the first polarization film and the second polarization film;
   a liquid molecule layer, disposed between the first glass substrate and the second polarization film; and
   a second glass substrate, disposed between the liquid molecule layer and the second polarization film.

5. A control system, comprising:
   an LCD panel, disposed on a backlight panel, comprising a plurality of display areas;
   a plurality of infrared ray (IR) sources, disposed on the backlight source according to correspondingly the positions of display areas, for emitting IR rays to pass through the LCD panel; and
   a controlled apparatus, receiving at least one of the IR rays, for executing an operating instruction according to intensities of the received IR rays,
   wherein the IR rays emitted from the IP sources pass through the LCD panel for transmitting a specific message to outside,
   wherein the controlled apparatus outside the LCD panel is controlled by a content of the specific message, wherein the different content of the specific message induces different responses of the controlled apparatus.

6. The control system according to claim 5, wherein the LCD panel comprises:
   a first polarization film;
   a second polarization film, the polarizing direction thereof is orthogonal with the first polarization film;
   a first glass substrate, disposed between the first polarization film and the second polarization film;
   a liquid molecule layer, disposed between the first glass substrate and the second polarization film; and
   a second glass substrate, disposed between the liquid molecule layer and the second polarization film.

7. A display device, comprising:
   an LCD panel, includes a plurality of display areas;
   a backlight panel, disposed behind the LCD panel; and
   a plurality of infrared ray (IR) sources, disposed in the backlight panel, for emitting IR rays to pass through the LCD panel, wherein the IR sources are correspondingly disposed according to the display areas,
   wherein the IR rays emitted from the IR sources pass through the LCD panel for transmitting a specific message to outside of the display device,
   wherein a controlled apparatus outside the LCD panel is controlled by a content of the specific message, wherein the different content of the specific message induces different responses of the controlled apparatus.

8. The display device according to the claim 7, wherein the LCD panel comprises:
   a first polarization film;
   a second polarization film, wherein the polarizing direction thereof is orthogonal with the polarizing direction of the first polarization film;
   a first glass substrate, disposed between the first polarization film and the second polarization film;
   a liquid molecule layer, disposed between the first glass substrate and the second polarization film; and
   a second glass substrate, disposed between the liquid molecule layer and the second polarization film.

* * * * *